June 30, 1936.  C. E. OLSEN ET AL  2,045,869

SAFETY LINK TONGS

Filed Dec. 18, 1934

Carl E. Olsen
Joseph A. Peterson
INVENTORS

BY J. Vincent Martin
ATTORNEY.

Patented June 30, 1936

2,045,869

UNITED STATES PATENT OFFICE 2,045,869

SAFETY LINK TONGS

Carl E. Olsen and Joseph A. Peterson, Houston, Tex.

Application December 18, 1934, Serial No. 758,001

6 Claims. (Cl. 81—68)

This invention relates to tongs, and more particularly to the class of tongs that use chains and which are specially adapted for use in connection with pipe.

Among the objects of this invention are the attainment of maximum flexibility of the chain parts and greater safety in their use.

The foregoing and other objects have been attained by means preferably interposed in the chain formation, which means is flexible allowing ready utilization with pipe members of varying diameter and having in combination therewith means which is rigid under all conditions of normal loading, and which yields in a predetermined manner under conditions of excess loading so as to avoid destruction of the equipment, parting of the chain or possible injury to the operators.

Figure 1:
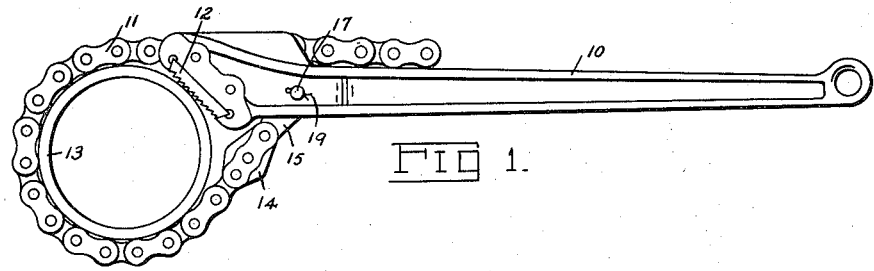
Fig. 1 is a plan view of a device incorporating the novel features of this invention.
Figure 2:
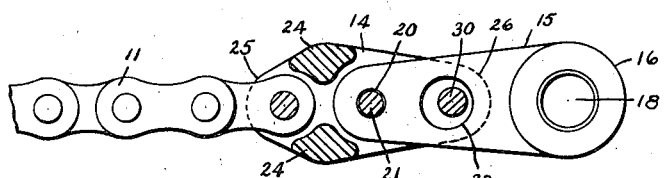
Fig. 2 is an enlarged plan view showing some of the parts partially in section.
Figure 3:
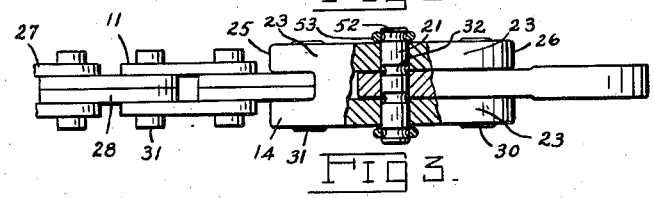
Fig. 3 is an elevation of a chain incorporating the features of this invention, a portion of the safety links being shown in section.

This invention will be better understood when considering the drawing in connection with the following specification and appended claims:

In Fig. 1 the invention is illustrated as applied to a form of tongs sometimes called a "back-up tongs". The tongs are composed essentially of a handle 10, a flexible chain 11, and a pipe grip or bit portion 12. These parts are shown in position with respect to a section of pipe 13. Interposed in the flexible chain 11 is a safety link 14 providing against breakage of the chain without destroying the chain's normal flexibility.

In this particular embodiment the device includes a master link 15 embodying in combination certain features of flexibility and having an enlarged end portion 16 arranged to cooperate with the handle 10 by means of the master link handle pin 17. This latter pin extends through suitable openings in the handle and an opening 18 in the link. Securement of the pin to the handle may be by any of a number of well known expedients, such as the use of cotter pins 19. At its opposite end link 15 contains an opening 20 for the reception of a pin 21 whereby the master link is secured to the link element 14. Disposed between the openings 18 and 20 in the master link is a further opening 22 of such size and configuration as to insure the adaptation of the chain to pipe sections of different diameter, and to further provide necessary slack for the assembling of the tongs in relation to the pipe. It is readily understood that although the link 15 combines the functions of a master link and the features of the present invention, this arrangement is not by way of limitation, but for the purpose of illustrating a preferred embodiment, as its right hand end may be so constructed as to cooperate with another portion of chain 11 instead of with the handle 10.

Link 14 is preferably substantially diamond shape, with two side wall portions 23 interconnected by portions 24 of suitable form to retain the link in its normal shape and resist any tendency of the ends 25 and 26 to spread.

All of the pins used in the tongs with the possible exception of the master pin 19 are preferably of the same diameter so that they may be readily interchanged. The pin 21 is of the same diameter as the other pins but is arranged so as to shear through if an excessive load is applied to the apparatus. This is accomplished either by constructing it of different material from the remaining parts of the chain, or by making it with suitably reduced portions substantially in the plane between the component parts of the links 14 and 15. In this manner breakage of the remaining parts of the device is substantially precluded because the pin 21 will always give way before the other parts of the chain can break. The various chain links 27 and 28 of the device are interchangeable so that the inside links 28 and the outside links 27 in case of breakage may be readily replaced or interchanged.

The pivoting of link 15 with respect to link 14 is about the shearable pin 21 as a pivot. This provides the normally fixed pivot between these two elements. The enlarged opening 22 in link 15 allows the latter to pivot about the point 20. A further interconnection between these two elements is by means of a pin 30 which is of standard construction, as are the remaining pins 31 of the chain, and which passes through opening 22.

In operation the tongs are assembled with respect to the pipe, the final position being similar to that illustrated in Fig. 1. As long as the load applied to the tongs does not exceed that for which they are normally to be used, the parts remain in the relation illustrated. If, however, this load for any reason should approach the normal strength of the links 11 or the pins 31, a shearing action will take place in the pin 21 at the points 32, where the pin is reduced in section. This reduced section is preferably arcuate in transverse section so that the point of actual shear will preferably occur midway of the reduced section portion. With this pin alone the chain would separate into at least two component parts and fly away from the pipe, possibly destroying additional equipment or injuring persons in the immediate vicinity. To avoid these conditions, a further connection between the links 14 and 15 is by means of a pin 30 and the enlarged opening 22. The enlarged opening allows the chain to spread or extend in the direction of its length when the pin 21 is sheared while still maintaining a continuity of the chain construction per se. In this manner the immediate excess load is dissipated through the breakage of the pin 21 and the chain is maintained as a continuous member and prevented from separating into several parts.

Figure 4:
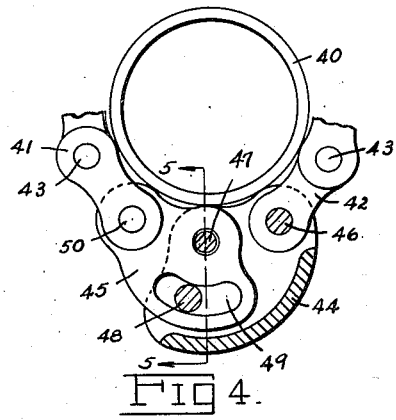
Fig. 4 is a variation in the construction of the invention as illustrated in Figs. 1 to 3.
Figure 5:
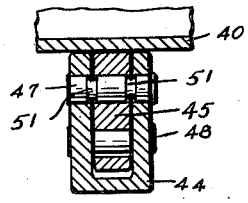
Fig. 5 is a cross section on the line 5—5 of Fig. 4.

A further variation of the construction described is illustrated in Figs. 4 and 5 wherein the safety link is of such construction to be readily interposed at substantially any point in the chain, and is of such type as to be readily utilizable with respect to pipes of relatively small diameter. In this variation the chain is composed of interchangeable links 41 and 42 interconnected by pins 43. Interposed between the two portions of the chain are the elements 44 and 45 comprising the safety link. The member 44 is substantially U-shaped in transverse section having a plurality of openings arranged to receive the pins 46, 47 and 48. Pin 46 connects one end of the chain for example link 42 to the portion 44 of the safety link. Pin 47 interconnects parts 44 and 45 and is preferably of construction similar to the pin 21. Pin 48 is arranged to pass through an arcuate slot 49 in the link member 45, and is arranged so that the parts 44 and 45 pivot about point 47 with a predetermined limited movement. Link 45 is connected to the opposite chain end by pin 50. Pins 43, 46, 50 and 48 are interchangeable and may be substituted for the pin 47 if need should arise. A further detailed description of pin 47 is not believed necessary inasmuch as it preferably incorporates a plurality of reduced section portions 51 as found at 32 in pin 21. It is readily apparent that with pins 50, 47 and 46 spaced at uniform intervals corresponding to the pitch of the remaining links of the chain, that a very close and flexible arrangement is provided for cooperation with the pipe 49. Similarly in this construction if an excess load is applied to the chain the pin 47 will shear through at 51 and the chain may become extended due to the shearing of the pivots at 47, but the extension will be predetermined due to the cooperation of pin 48 and the slot 49.

The pins 21 and 47 may be secured or retained in the chain by any of various suitable expedients, such as the peening over of the ends, or the use of cotter pins, or by the use of an additional slot 52 at one or both extremities similar to the slots 32 and 51 in which may be interposed a split ring 53 of such diameter that it will prevent the pin normally from being displaced but which will readily contract and allow the pin to be removed if a sharp blow is applied to either end of the pin.

It is now clear that the chain may break at a predetermined point due to excess or abnormal loading in use, thus preventing the destruction of the links, but at the same time it is maintained as a continuous entity.

Although the invention has been described as applied to a particular embodiment for the purposes of illustration, various other modifications within the true spirit and scope of the invention are aimed to be covered by the hereto appended claims.

We claim:

1. A safety linkage for chain type pipe tongs comprising two links arranged to be connected as a portion of a chain, two pivots interconnecting said links, and means whereby one of said pivots is relatively fixed and the other allows relative movement between the links about the first pivot said first pivot being relatively weaker than said second pivot.

2. A safety linkage comprising a plurality of links, a plurality of pivots interconnecting a pair of adjacent links, one of said pivots being the more readily shearable, another of said pivots loosely engaging one of said links to allow relative pivotal motion of said links about the first pivot and arranged to maintain a different predetermined continuity of the linkage upon the shearing of the first named pivot.

3. A safety linkage comprising a plurality of links, a plurality of pivots interconnecting a pair of adjacent links, one of said pivots being of reduced section and the more readily shearable of said pivots, another of said pivots loosely engaging one of said links to allow relative pivotal motion of said links about the first pivot and arranged to maintain a different predetermined continuity of the linkage upon the shearing of the first named pivot.

4. A chain safety linkage comprising in combination link elements interconnected and arranged to have predetermined pivotal movement, a destructible pivotal connection between two of said elements, and means for maintaining the continuity of said linkage upon destruction of said destructible connection.

5. A safety linkage including a plurality of interconnecting links, a destructible pivotal connection between two of said links, and means normally limiting pivotal movement about said pivotal connection, and for maintaining continuity of said links upon destruction of said destructible connection.

6. A safety linkage comprising a pair of links and a plurality of spaced pivots interconnecting said links, one of said pivots having a relatively close engagement with both of said links to provide a relatively fixed pivotal connection therebetween, said pivot being the relatively more readily shearable and the other of said pivots having a relatively loose engagement with one of said links to provide for relative pivotal motion of said links about said first pivot, and for maintaining the continuity of said linkage upon shearing of said first pivot.

CARL E. OLSEN.
JOSEPH A. PETERSON.